Figure 1:
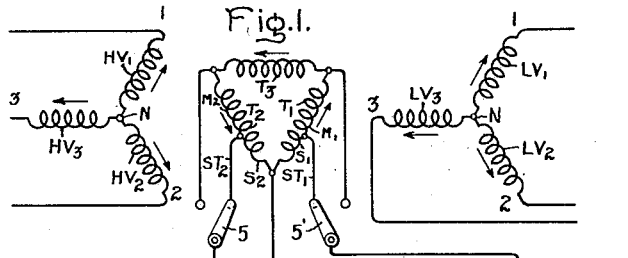

Feb. 6, 1945.　　　A. N. GARIN　　　2,369,038
ELECTRIC TRANSFORMER
Filed April 7, 1943

Inventor:
Alexis N. Garin,
by Harry E. Dunham
His Attorney.

Patented Feb. 6, 1945

2,369,038

UNITED STATES PATENT OFFICE 2,369,038

ELECTRIC TRANSFORMER

Alexis N. Garin, Pittsfield, Mass., assignor to General Electric Company, a corporation of New York Application April 7, 1943, Serial No. 482,121

7 Claims. (Cl. 171—119)

This invention relates to electric transformers and more particularly to an improved tap connection for such transformers.

A common way of obtaining reduced voltage from a transformer is to provide one of its windings with an intermediate tap which is at reduced voltage. For example, synchronous condensers are often connected to high voltage transmission lines through step-down power transformers consisting of a bank of three single-phase transformers whose primary windings are Y connected and whose secondary windings are delta connected. Two of the secondary windings are each provided with an intermediate tap, the voltages between these taps and one corner of the delta being numerically equal so that, in effect, one corner of the delta is used as a smaller open delta to provide reduced voltage for starting the synchronous condenser. It is, of course, desirable that the single-phase transformers be interchangeable so that a single spare transformer can be connected in any one of the phases of the three-phase system. However, the reduced voltage taps are usually not connected to the midpoint of their respective windings so that it would be necessary to have the connections of the transformers reversible if they are to be used in different phases of the three-phase connection. The difficulty with this is that in many cases the insulation of the high voltage winding of the transformers is graded. Thus, the high voltage winding has one terminal which is adapted for connection to the neutral of the Y and which has relatively low insulation and the insulation of the winding is increased progressively until it is a maximum at the other or high voltage terminal. The result is that the connections of the high voltage winding cannot be reversed so that the connections of the tapped winding cannot be reversed without reversing its voltage with respect to the voltage of the other windings.

Heretofore, this difficulty has been overcome by providing each tapped winding with two taps which are equally spaced from its ends. One tap is used when the transformer is connected in one phase and the other tap is used when the transformer is connected in the other phase. However, this has a number of serious objections. In the first place, it requires either a relatively large number of coils for the tapped winding or else the taps must be located at intermediate points on the coils. The first arrangement is expensive and the second arrangement requires that the leads from the taps be brought across the face of the coils, and as the spacing between coils or between the core and the coils is very small, it is very difficult to insulate such leads. Furthermore, the axially unsymmetrical position of the starting tap displaces the magnetic center of the tapped coils with respect to the magnetic center of the coils of the other winding or windings of the transformer so that large mechanical forces can be produced. Also, the conductors of the windings of such transformers usually consist of a number of strands in parallel which must be transposed between terminals so as to provide equal current distribution in the strands and the location of a tap between the terminals of a coil requires that the portions of the coil between its terminals and its taps must have the strands transposed for equal current distribution, therefore considerably complicating the transposition problem. In addition, if one of the other transformer windings has parallel connected voltage adjusting taps the displacement of the magnetic centers of the coils will cause large circulating currents to flow in the coil of the first-mentioned winding. Still another objection is that the two starting taps will often have different reactances with respect to the other windings of the transformer.

In accordance with this invention all of the above difficulties and objections are eliminated by means of a special connection changing arrangement whereby only one tap is used and its effective position in the winding is shifted while maintaining the polarity of the winding the same.

An object of the invention is to provide a new and improved electric transformer.

Another object of the invention is to provide a transformer with an improved intermediate voltage tap connection.

A further object of the invention is to provide a new and improved starting tap type single-phase transformer which may be interchangeably connected in the phases of a three-phase system.

The invention will be better understood from the following description taken in connection with the accompanying drawing and its scope will be pointed out in the appended claims.

Figure 2:
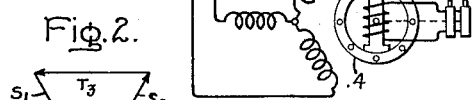
Figure 3:
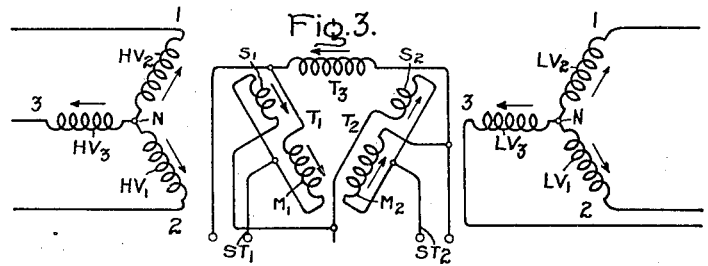
Figure 4:
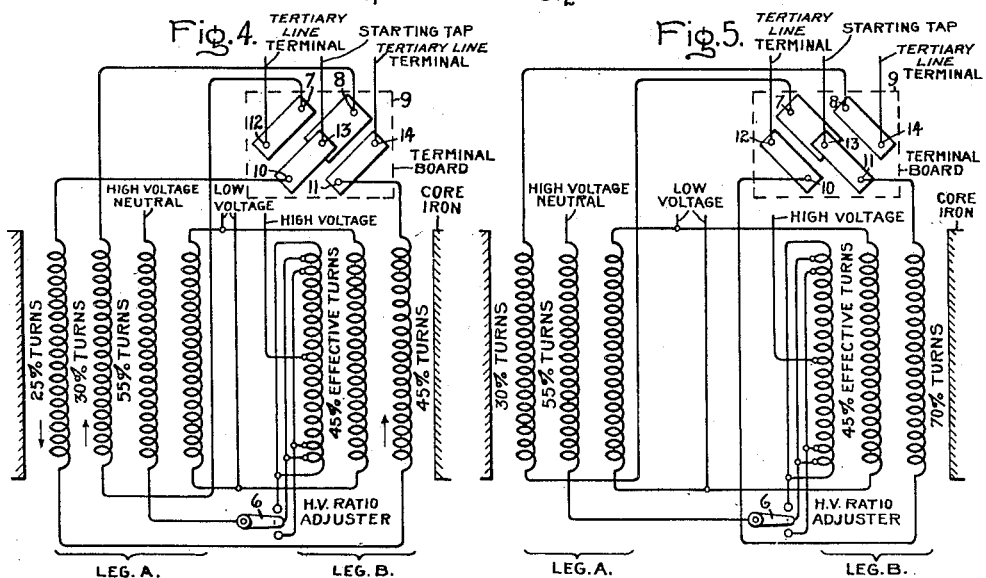
Figure 5:
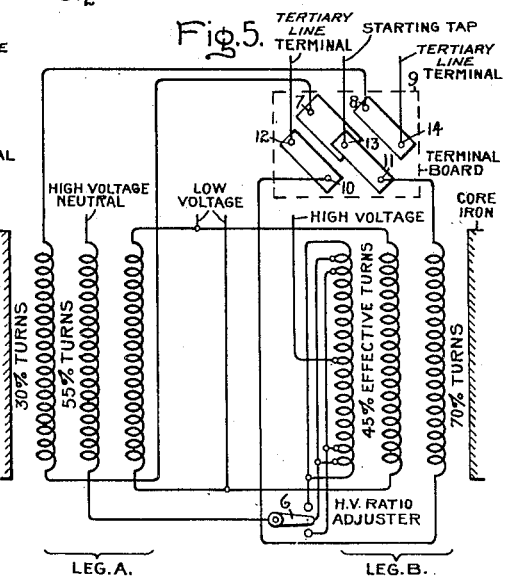

In the drawing Fig. 1 illustrates diagrammatically a three-phase system in which the invention may be used, Fig. 2 is a vector diagram for explaining a feature of the invention, Fig. 3 illustrates diagrammatically how the connections are changed in accordance with my invention when the transformers in two of the phases of the three-phase system are interchanged, Fig. 4 shows the details of one form of transformer embodying the present invention, and Fig. 5 is a modification of Fig. 4.

Referring now to the drawing and more particularly to Fig. 1, there is shown therein a three-phase bank of three single-phase transformers. The phases of the system are numbered 1, 2 and 3 and each transformer consists of three windings, namely a high voltage winding, a low voltage winding and a tertiary winding designated respectively by $H_V$, $L_V$ and $T$ and identified further by subscripts corresponding to the appropriate phases in which they are connected. The high voltage and low voltage windings are shown Y connected and the tertiary winding is shown delta connected. The tertiary winding $T_1$ is provided with a starting tap $ST_1$ which divides its winding into a starting portion $S_1$ and a main portion $M_1$, and similarly tertiary winding $T_2$ is provided with a starting tap $ST_2$ which divides it into a starting portion $S_2$ and a main portion $M_2$.

A three-phase load for the tertiary winding is shown by way of example as a synchronous condenser 4 whose terminals are selectively connectable across the starting corner of the tertiary winding and across the whole winding by means of switches 5 and 5'. These switches are shown in the starting position in which a symmetrical three-phase voltage of reduced magnitude is impressed on the armature of the machine 4. By moving the blades of these switches outwardly the symmetrical full voltage of the tertiary winding may be applied to the armature of the machine.

The arrows associated with each of the windings in Fig. 1 correspond in direction to the vector voltages of these windings.

As has previously been explained, the grading of the insulation of the high voltage windings prevents the reversal of the connections of these windings so that the vector voltages of the tertiary windings are relatively fixed. If now the transformers in phases 1 and 2 are interchanged the result would be that the starting taps would be effectively shifted, as shown in Fig. 2, so that the starting voltage instead of being less than half the full voltage of the tertiary winding would now be more than half of the full voltage. It is therefore apparent that the single-phase transformers are not interchangeable with the result that no single similar transformer could be a spare for use in both phases 1 and 2.

In order to overcome this objection and make the transformers fully interchangeable I make the winding section M and S of the tertiary windings separate coils and provide means for changing their connections from that shown in Fig. 1 to that shown in Fig. 3. This latter figure shows the transformers for phases 1 and 2 interchanged and shows the electrical order of the main and starting portions of the windings interchanged with respect to the starting tap for each winding but in such a manner as to preserve the polarity of the windings as a whole. Thus, the starting taps $ST_1$ and $ST_2$ in Fig. 3 have the same voltage difference as they do in Fig. 1.

Fig. 4 shows a single-phase two-legged core concentric winding type transformer embodying the present invention. As will be seen, the coils are in two groups which are concentrically mounted on the respective core legs. It should be understood that the drawing is not to scale and that the indicated percentage turns of the coils are not at all critical and are given by way of example only. The high voltage winding has a coil with 55 percent of the total effective turns mounted on leg A in series with a coil having 45 percent of the total effective turns mounted on leg B. The high voltage neutral connection is connected to the 55 percent coil and the high voltage line terminal is connected to the midpoint of the 45 percent coil which consists of two parallel circuits forming respectively the upper and the lower halves of the coil. The ends of the 45 percent coil are tapped and taps having corresponding voltage differences from the midpoint are directly connected together and are then connected to contacts of a high voltage ratio adjuster 6. In this manner the ratio of the transformer can be adjusted without affecting the magnetic center of the 45 percent coil. As the 45 percent high voltage coil is the outer coil on the leg B there is ample space for insulating the tap connections.

The low voltage winding comprises a pair of parallel-connected coils mounted respectively on the legs A and B.

The tertiary winding comprises two coils on leg A having 25 percent and 30 percent of the total turns of the winding and a coil on the leg B having 45 percent of the total turns. In this manner the total turns are roughly the same on the two legs. The 30 percent coil corresponds to the starting portion of the winding and its terminals are connected to studs 7 and 8 of a terminal board 9. The remaining two coils of the tertiary winding are connected in series and constitute the main portion of the winding and the terminals of this main portion are connected to studs 10 and 11 on the terminal board. The terminal board is also provided with three terminals 12, 13 and 14, 12 and 14 being line terminals and 13 being the starting tap terminal. The terminal board is also provided with four connecting links which in the positions shown connect stud 7 to terminal 12, studs 8 and 10 to starting tap terminal 13, and stud 11 to terminal 14. Following these connections through the windings it will be seen that if we start at the left-hand tertiary line terminal 12 the circuit is first through the starting or 30 percent coil and then through the other two coils in series. However, by rearranging the links on the terminal board, as shown in Fig. 5, the connections will be so changed that starting from the terminal 12 the circuit will first be through the main portion of the tertiary winding comprising the 25 percent and 45 percent coils in series to the starting tap and then from the tap through the starting or 30 percent coil, and it will further be observed that the direction of the connections is the same in both cases, that is to say, with the same flux in the core the relative polarities of the starting and main portions of the tertiary winding with respect to the three terminals of the terminal board are not changed.

With this arrangement the starting tap will have exactly the same reactances with respect to the other windings of the transformer for both terminal board connections and as the starting tap is in each case connected to the end of a coil and not to an intermediate tap in a coil there is no displacement of the magnetic center of any of the coils nor are there any transposition difficulties.

Fig. 5 in addition to showing the second position of the connecting links on the terminal board also shows how the number of coils can be reduced by combining the 25 percent and 45 percent coils of the tertiary winding into a single 70 percent coil mounted on leg B. This is a more economical arrangement than Fig. 4 and should be used in preference to Fig. 4 whenever the change from the 55 percent to 45 percent turn division between the two legs of the tertiary winding to a 30 percent-70 percent division with the accompanying change in reactances between the tertiary winding and the other windings can be tolerated.

It is again emphasized that the particular percentage turns of the coils in Figs. 4 and 5 are not part of the invention and that many other percentages can equally well be used. Furthermore, Figs. 4 and 5 are not intended to indicate the relative direction of windings of various coils forming the three windings of each transformer, it being understood that all series-connected and all parallel-connected parts of each winding are wound in the proper relative direction in accordance with the principles well known to the art.

While there have been shown and described particular embodiments of this invention, it will be obvious to those skilled in the art that various changes and modifications can be made therein without departing from the invention and, therefore, it is aimed in the appended claims to cover all such changes and modifications as fall within the true spirit and scope of the invention.

What I claim as new and desire to secure by Letters Patent of the United States is:

1. In combination, a transformer having a core provided with core legs on which are distributed a first winding and a second winding, said second winding being divided into a major section and a minor section, three terminals for said second winding two of which are end terminals and the other of which is an intermediate terminal, and means for selectively connecting (1) the major section between one end terminal and the intermediate terminal with the minor section between said intermediate terminal and the other end terminal and (2) the minor section between said one end terminal and said intermediate terminal with the major section between said intermediate terminal and said other end terminal.

2. The combination as in claim 1 in which the relative polarities of the sections are the same with connections (1) and (2).

3. The combination as in claim 1 in which said winding sections comprise untapped coils which extend substantially the entire length of their respective core legs.

4. The combination as in claim 1 in which the transformer also has a high voltage winding provided with graded insulation.

5. In combination, a single-phase transformer having a winding provided with a single reduced voltage motor starting tap, a connection changer for adapting said winding for operation as any phase of a delta-connection, said connection changer including means for shifting the effective position of said starting tap, and an exciting winding on said transformer adapted for operation as one phase of a Y connection, said exciting winding having graded insulation for withstanding progressively higher voltage stress when going from the neutral to the line end thereof whereby the polarity of the connections of said winding in the Y connection cannot safely be reversed.

6. In a single-phase two-legged core concentric winding type of transformer, in combination, a high voltage winding comprising at least two serially connected coils mounted respectively on the two core legs, said coils being provided with graded insulation, another winding comprising at least a pair of unequal coils mounted respectively on the core legs concentrically with the coils of said high voltage winding, a terminal board for said last-mentioned winding having at least three terminals, and means for connecting said two coils of the last-mentioned winding in series between two of said terminals with the third terminal connected to the junction of said two coils, and means for so changing the connections that the coils which are connected respectively between said third terminal and the other two terminals are interchanged while keeping the polarity of the other two terminals the same.

7. A three-phase transformer system comprising a Y-connected primary winding whose phases have graded insulation so that the polarity of their connections cannot safely be reversed, a delta-connected winding two of whose phases each have a tap which together with one corner of the delta constitute a similar but reduced size open-delta connection for reduced voltage motor starting, and means for permitting interchange of said two tapped phase windings in said delta connection without requiring reversal of the polarity of the connections of their associated primary phase windings and without changing the size of said open-delta connection comprising connection changers for electrically transposing the two portions of each of said tapped phase windings which are on opposite sides of their respective taps without changing the relative polarity of those portions.

ALEXIS N. GARIN.